United States Patent
Hengeveld et al.

(10) Patent No.: US 7,599,496 B2
(45) Date of Patent: Oct. 6, 2009

(54) SECURE ENCRYPTION KEY DISTRIBUTION

(75) Inventors: Thomas Andrew Hengeveld, Hollis, NH (US); Dennis Michael Martinez, Westford, MA (US)

(73) Assignee: Pine Valley Investments, Inc., Las Vegas, NV (US)

( * ) Notice: Subject to any disclaimer, the term of this patent is extended or adjusted under 35 U.S.C. 154(b) by 689 days.

(21) Appl. No.: 10/228,747

(22) Filed: Aug. 27, 2002

(65) Prior Publication Data

US 2004/0054891 A1 Mar. 18, 2004

(51) Int. Cl.
*H04L 9/00* (2006.01)
(52) U.S. Cl. ...................................... 380/278
(58) Field of Classification Search .................. 380/278
See application file for complete search history.

(56) References Cited

U.S. PATENT DOCUMENTS

| | | | |
|---|---|---|---|
| 4,905,302 A | 2/1990 | Childress et al. | 455/34 |
| 5,418,854 A * | 5/1995 | Kaufman et al. | 713/156 |
| 5,426,700 A | 6/1995 | Berson | |
| 5,528,691 A | 6/1996 | Rosauer et al. | 380/21 |
| 5,619,572 A | 4/1997 | Sowa | 380/21 |
| 5,768,380 A | 6/1998 | Rosauer et al. | 380/21 |
| 6,002,770 A | 12/1999 | Tomko et al. | |
| 6,085,323 A * | 7/2000 | Shimizu et al. | 713/150 |
| 6,226,618 B1 * | 5/2001 | Downs et al. | 705/1 |
| 6,266,420 B1 * | 7/2001 | Langford et al. | 380/282 |
| 6,816,966 B1 | 11/2004 | Gupta et al. | |
| 6,862,684 B1 | 3/2005 | DiGiorgio | |
| 7,055,030 B2 | 5/2006 | Negawa | |
| 2002/0019944 A1 | 2/2002 | Kou | |
| 2003/0031322 A1 * | 2/2003 | Beckmann et al. | 380/278 |
| 2003/0046539 A1 * | 3/2003 | Negawa | 713/163 |
| 2003/0149874 A1 * | 8/2003 | Balfanz et al. | 713/168 |

* cited by examiner

*Primary Examiner*—Andrew L Nalven
(74) *Attorney, Agent, or Firm*—Allen, Dyer, Doppelt, Milbrath & Gilchrist, P.A.

(57) ABSTRACT

A method for distributing encryption keys for use in communication systems such as trunked radio communication systems. Group traffic keys are encrypted at a key administrator and passed to a distribution facility for storage and distribution. The distribution facility passes the encrypted group traffic key to communication devices where the group traffic keys are decrypted and used to encrypt/decrypt traffic.

31 Claims, 3 Drawing Sheets

SECURE ENCRYPTION KEY DISTRIBUTION

FIELD OF THE INVENTION

The present invention relates to encrypted communication systems and, more particularly, to the distribution of encryption keys.

BACKGROUND OF THE INVENTION

Communication systems often use data encryption techniques to transfer communication data (i.e., traffic) in a secure manner. Security is provided through the use of encryption keys that are used by communication devices (e.g., mobile radios) to encrypt and decrypt the traffic. A common encryption technique for use in communication systems, especially trunked radio communication systems, is a symmetric encryption system (SES) in which the same traffic encryption key is used by a sender to encrypt traffic and by one or more receivers to decrypt the traffic. Typically, a common traffic encryption key is shared by a group of authorized users (e.g., members of a police or fire department) and is updated periodically to increase security. In operation, updates to group traffic encryption keys (GTKs) are transferred to communication devices of all authorized group members so that they may encrypt/decrypt traffic to/from other group members. To preserve the integrity of an SES communication system, the communication system needs to prevent unauthorized individuals from accessing the GTKs.

FIG. 1 depicts a typical encryption key distribution system for distributing GTKs to enable secure communications between group member communication devices, e.g., the communication devices of a group of authorized users. The distribution system includes a key administrator 102 that generates the GTKs, a key distribution and storage facility 104 for storing and distributing the GTKs, and a plurality of group devices (represented by group member #1 communication device 100a and group member #2 communication device 100b) that use the GTKs to encrypt/decrypt traffic between group member communication devices 100a, b. Typical encryption key distribution systems are described in U.S. Pat. No. 5,528,691 to Rosauer et al., U.S. Pat. No. 5,619,572 to Sowa, and U.S. Pat. No. 5,768,380 to Rosauer et al., incorporated fully herein by reference.

In use, the key administrator 102 generates a GTK for use by the group member communication devices 100a, b to encrypt/decrypt traffic. The key administrator 102 passes the current unencrypted GTK to a key distribution and storage facility 104 where it is stored unencrypted. The GTKs is then encrypted using a group encryption key (GEK) and transferred to the individual group member communication devices 100a, b by the key distribution and storage facility 104. The individual group member communication devices 100a, b, using a previously stored GEK identical to the GEK used by the key distribution and storage facility 104 to encrypt the GTK, decrypt the GTK for use in encrypting/decrypting traffic between group devices 100a, b.

The encryption key distribution system described in reference to FIG. 1 is commonly used in the communication systems employed by many private organizations and by public service organizations, such as police, fire, and ambulance squads. The key administrator 102 and the group member communication devices 100a, b are typically secure, i.e., are under the direct control of a particular organization and its associated personnel. Typically, however, multiple groups use a single key distribution and storage facility 104 that is under the control of a third party, e.g., a private corporation. For example, in a communication system for use by a police department, the police department maintains control over a key administrator 102 that resides on its premises and police officers maintain control over the individual group member communication devices 100a, b. The key distribution and storage facility 104, however, is typically managed by an organization that is not under the direct control of the police department. Since the key distribution and storage facility 104 is under the control of a third party, it is potentially unsecure. Therefore, the potential exists for unauthorized users to gain access to the GTKs stored on the unsecure key distribution and storage facility 104, thereby compromising the integrity of the communication system.

Accordingly, there is a need for secure methods and systems for storing and distributing GTKs. The present invention fulfills this need among others.

SUMMARY OF THE INVENTION

The present invention provides for a method and system for securely distributing GTKs. The aforementioned problem is overcome by encrypting the GTKs at the key administrator and decrypting them only at authorized group member communication devices. The encrypted GTKs are passed from the key administrator to a key distribution and storage facility, stored at the key distribution and storage facility, and distributed from the key distribution and storage facility to authorized group member communication devices. The encrypted GTKs are then unencrypted by the authorized group member communication devices for use in encrypting/decrypting traffic between group member communication devices. Therefore, in potentially unsecure locations, e.g., at a key distribution and storage facility under the control of a third party, the GTKs are encrypted, thereby preventing unauthorized users from gaining access to the GTKs and increasing the integrity of the communication system.

One aspect of the present invention is a method for distributing encryption keys. The distribution method includes encrypting a group traffic key at a key administrator, passing the encrypted group traffic key to a distribution system for storage and distribution, distributing the encrypted group traffic key from the distribution system to at least one communication device, receiving the encrypted group traffic key at one of the at least one communication devices, and decrypting the encrypted group traffic key at the one of the at least one communication devices.

Another aspect of the invention is a system for distributing encryption keys. The system includes an encrypted group traffic key generator for encrypting a group traffic key, a distribution system for receiving the encrypted group traffic key from the encrypted group traffic key generator, the distribution system storing the encrypted group traffic key, and at least one group device for receiving the encrypted group traffic key from the distribution system, the at least one group device capable of decrypting the encrypted group traffic key to obtain the group traffic key.

DETAILED DESCRIPTION OF THE INVENTION

Figure 1:
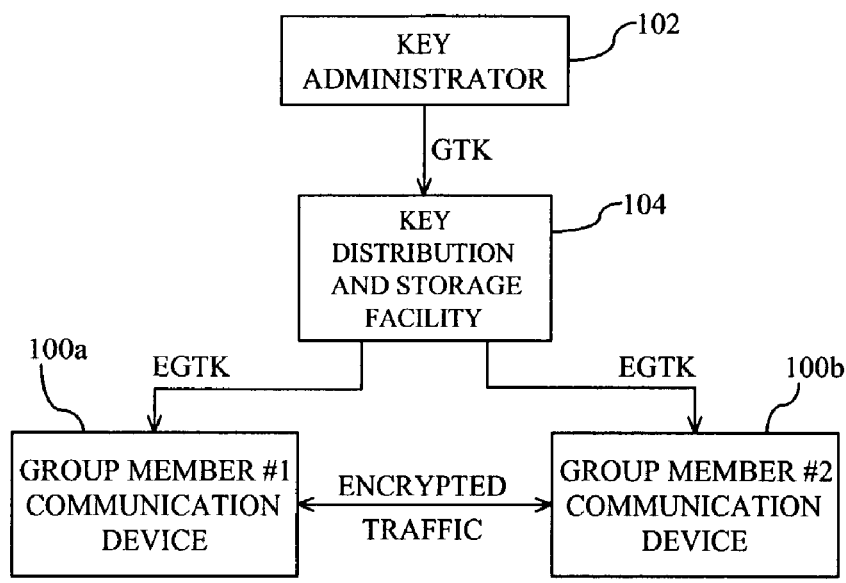
FIG. 1 is a block diagram of a prior art encryption key distribution system.
Figure 2:
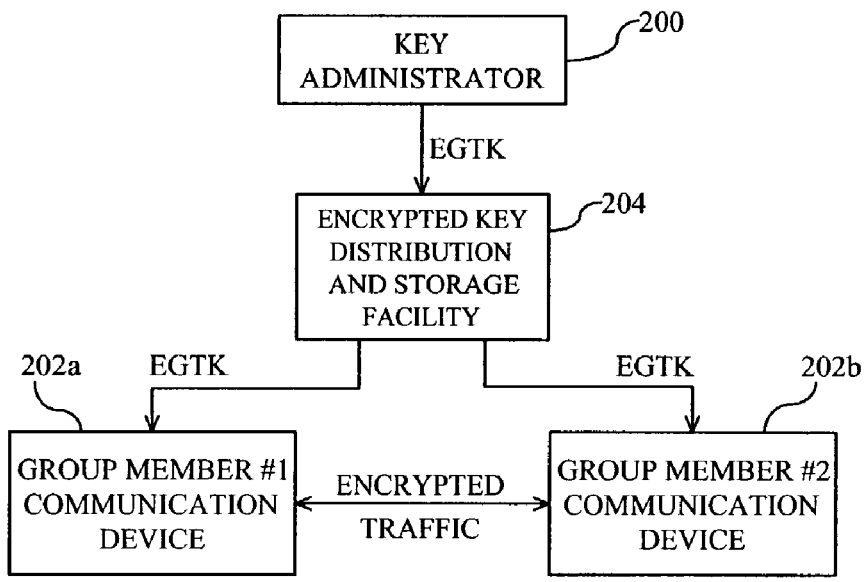
FIG. 2 is a block diagram of an encryption key distribution system in accordance with the present invention.

FIG. 2 is a block diagram of an encryption key distribution system for use in a communication system in accordance with the present invention. Generally, a key administrator 200 generates a group traffic key (GTK) for encrypting/decrypting traffic between group member communication devices ("group devices") 202a, b and encrypts the GTK using a group encryption key (GEK) that is known or can be derived by the individual group devices 202a, b. The key administrator 200 transfers the encrypted GTK (EGTK) to an encrypted key distribution and storage facility ("distribution facility") 204 for storage. The distribution facility 204 then transfers the EGTK to the individual group devices 202a, b. The individual group devices 202a, b use the known or derived GEK to decrypt the EGTK to obtain the GTK. The individual group devices 202a, b then use the GTK to encrypt traffic for transmission to and decrypt traffic received from other group devices 202a, b.

The present invention is particularly well suited, although not exclusively so, for use in public and private radio communication systems such as trunked digital radio communication systems. For example, the present invention may be implemented using the existing architecture available in the OpenSky® trunked radio system available from M/A COM, Inc. of Lowell, Mass., USA. An embodiment of the present invention will now be described in detail with reference to FIG. 2A, which depicts the blocks of FIG. 2 in greater detail, with like elements having identical numbers. Two group devices 202a, b are illustrated for descriptive purposes, however, it will be readily apparent to those skilled in the art that essentially any number of group devices may be employed.

Figure 2A:
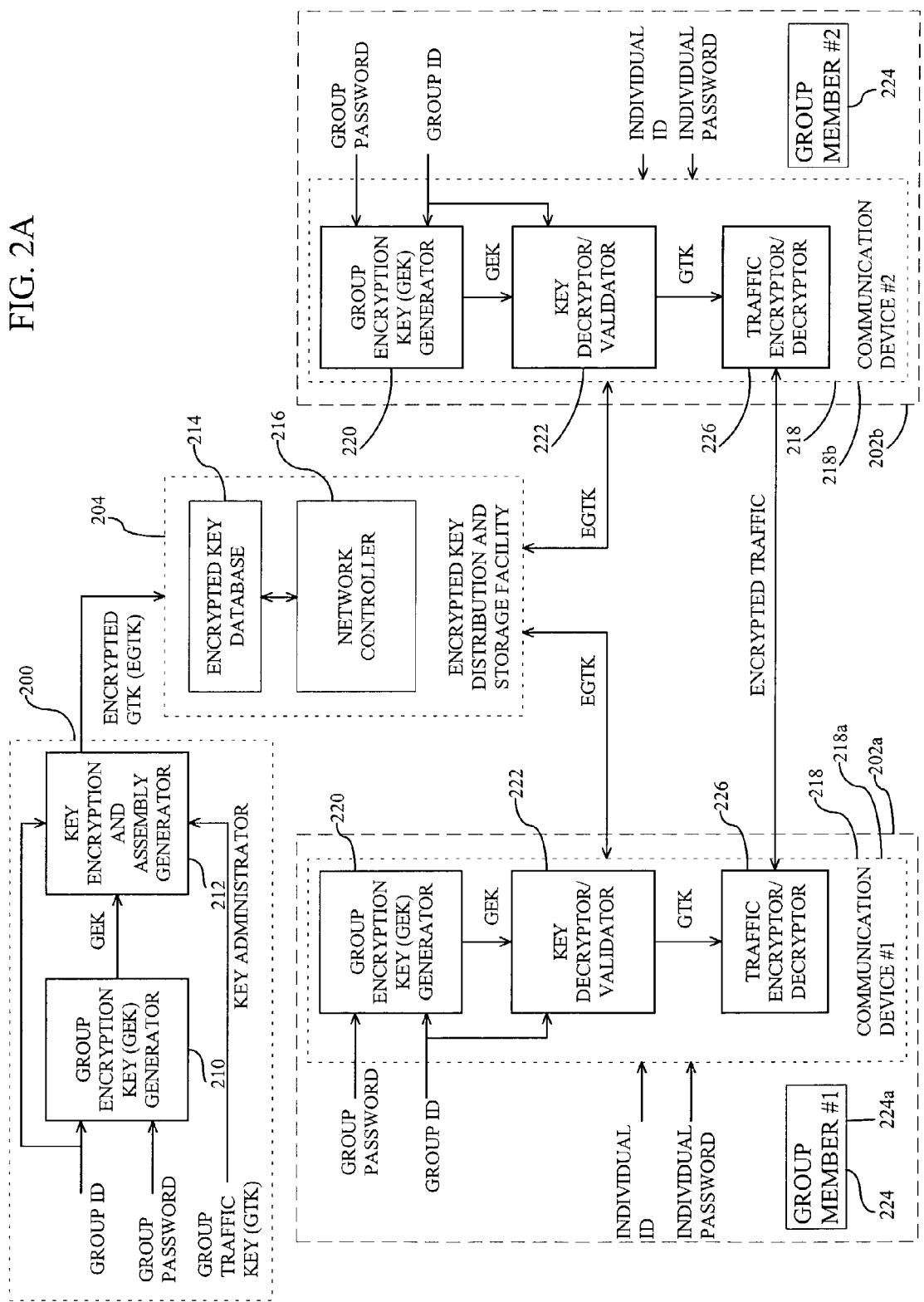
FIG. 2A is a detailed block diagram of an encryption key distribution system in accordance with an embodiment of the present invention.

Referring to FIG. 2A, the key administrator 200 generates the GTK in a known manner and encrypts the GTK using a group encryption key (GEK) to obtain the EGTK for storage and distribution by the encrypted key distribution and storage facility 204. In the illustrated embodiment, the GEK is generated by a group encryption key generator 210 based on a group ID and group password (or pass phrase) combination, which is known by the key administrator and each of the individual group devices 202a, b. Using the GEK, the GTK is encrypted at the key encryption and assembly generator 212 in a known manner to create the EGTK. The GTK will remain encrypted at all points within the distribution system until it is decrypted at a group device 202a, b for use in encrypting/decrypting traffic between group devices 202a, b.

In a preferred embodiment, the group encryption key generator 210 generates the GEK by combining the group ID and group password and applying a known secure hash, e.g., SHA-1, to the combination. Preferably, the group ID and the group password are combined by appending the group password to the group ID. In the preferred embodiment, the key encryption and assembly generator 212 performs the additional task of appending the group ID to the EGTK to facilitate storage and retrieval of the EGTK at the distribution facility 204.

The EGTK is stored and distributed by the distribution facility 204. In the illustrated embodiment, the distribution facility 204 includes an encrypted key database 214 and a network controller 216. The encrypted key database 214 stores the EGTK and the network controller 216 distributes the EGTK to the individual group devices 202a, b. Preferably, storage and distribution of the EGTK are facilitated through the use of a group ID appended to the EGTK by the key administrator 200. The distribution of the EGTK by the network controller 216 to the individual group devices 202a, b is described in greater detail below. In addition to distributing the EGTK, it will be readily apparent to those skilled in the art that the network controller 216 may perform other functions associated with conventional communication systems such as keeping track of group members, individual group member login IDs and passwords, and group member and individual group member privileges. In addition, the network controller 216 may manage traffic between group devices 202a, b. In a preferred embodiment, the encrypted key database 214 is a conventional database known to those in the art and the network controller 216 is a conventional controller such as the software implemented Voice Network Interface Controller (VNIC) housed on a Sun™ workstation in an OpenSky® communication system.

The individual group devices 202a, b receive the EGTK from the distribution facility 204, decrypt the EGTK to obtain the GTK, and use the GTK to encrypt traffic for distribution to and decrypt traffic received from other group devices 202a, b. In the illustrated embodiment, each group device 202a, b includes a communication device 218 having a group encryption key generator 220, a key decryptor/validator 222, and a traffic encryptor/decryptor 224. In a preferred embodiment, the communication devices are mobile radios such as the Mercury Series Mobile Radio (M-801), which is a software-based mobile radio that supports the OpenSky® communication protocol in the 800 MHz frequency band.

In the illustrated embodiment, the group encryption key generator 220 generates the GEK based on the group ID and group password known to the communication device 218. Preferably, the group ID and password are supplied to the communication device 218 by an authorized user of the communication device 218, e.g., a group member 224. As described above in reference to the group encryption key generator 210 in the key administrator 200, the group encryption key generator 220 may generate the GEK by combining the group ID and group password and applying a known secure hash to the combination to generate the GEK. Preferably, the group ID and the group password are combined by appending the group password to the group ID.

Using the GEK, the key decryptor/validator 222 decrypts and validates the EGTK in a known manner to obtain the GTK generated by the key administrator 200. The GTK is then used by a conventional traffic encryptor/decryptor 226 to encrypt/decrypt traffic between group devices 202a, b.

In a preferred embodiment, the communication device 218 contains a memory (not shown) for storing the EGTK. Thus, the EGTK need only be passed to the communication device 218 when the GTK is updated, thereby increasing key distribution efficiency. Preferably, the EGTK is stored in the memory and only retrieved and decrypted when needed to encrypt/decrypt traffic. Since the encrypted GTK, i.e., the EGTK, is stored, the GTK will remain secure even if the communication device 218 is in the possession of an unauthorized user (assuming that the group password and group ID are unknown and that a group member 224 has not logged into the communication device 218 without logging out subsequently), thereby increasing the integrity of the system.

In a preferred use, an individual group member 224a logs into a communication system by entering into a communication device 218a, e.g., via a keypad, an individual ID and password combination, which is associated with and unique to the individual group member 224a. The communication device 218a passes the individual ID and password to the network controller 216. The network controller 216 verifies the identity of the group member 224a, checks to see if the communication device 218a has the current EGTK for the group member's group, and, if the EGTK is not current, transfers the current EGTKs to the communication device 218a where it is stored locally. Once logged into the communication system, the network controller 216 monitors the encrypted key database 214 for EGTK entries by the key administrator 200 and transfers to the communication device 218a the current EGTK whenever it is updated by the key administrator 200.

Preferably, when the encrypted key database 214 is updated with a new EGTK for a group, the network controller 216 will transfer the EGTK to all communication devices 218 that are logged into the communication system as members of that group. In addition, the network controller 216 tracks when the individual communication devices 218 are logged into the communication system. If the network controller 216 determines that a communication device 218 was not logged into the communication system when the current EGTK for a group was stored in the encrypted key database 214, the network controller 216 will pass the EGTK to the communication device 218 the next time the communication device 218 logs into the communication system as members of that group.

In addition to the individual ID and password, the group member 224a enters into the communication device 218a the group ID and group password for the group(s) to which the group member 224a belongs, in order to decrypt the corresponding EGTK for that group. When traffic is generated by a first communication device 218a, e.g, communication device #1, for transmission to one or more second communication devices 218b, e.g., communication device #2, the traffic is encrypted by the first communication device 218a. The first communication device 218a encrypts the traffic by decrypting the locally stored EGTK using a GEK generated from the group ID and group password and encrypting the traffic using the resultant GTK. When encrypted traffic is received by the one or more second communication devices 218b, the communication devices 218b decrypt the traffic by decrypting the locally stored EGTK using a GEK generated from the group ID and group password and decrypting the traffic using the resultant GTK It will be recognized by those skilled in the art that a group member 224 may be a member of a plurality of groups and may enter a plurality of group ID/password combination for each of the plurality of groups. Preferably, when a group member 224 supplies an individual ID and individual password to the communication device 218 to log into the communication system, the network controller 216 identifies the groups associated with the group member 224 and updates the corresponding EGTKs as described above. The group member 224 then enters into the communication device 218 a group ID and group password for each group with which the group member 224 wants to communicate to decrypt the EGTK to enable traffic encryption/decryption using the resultant GTK for communication with those groups as described above.

Figure 3:
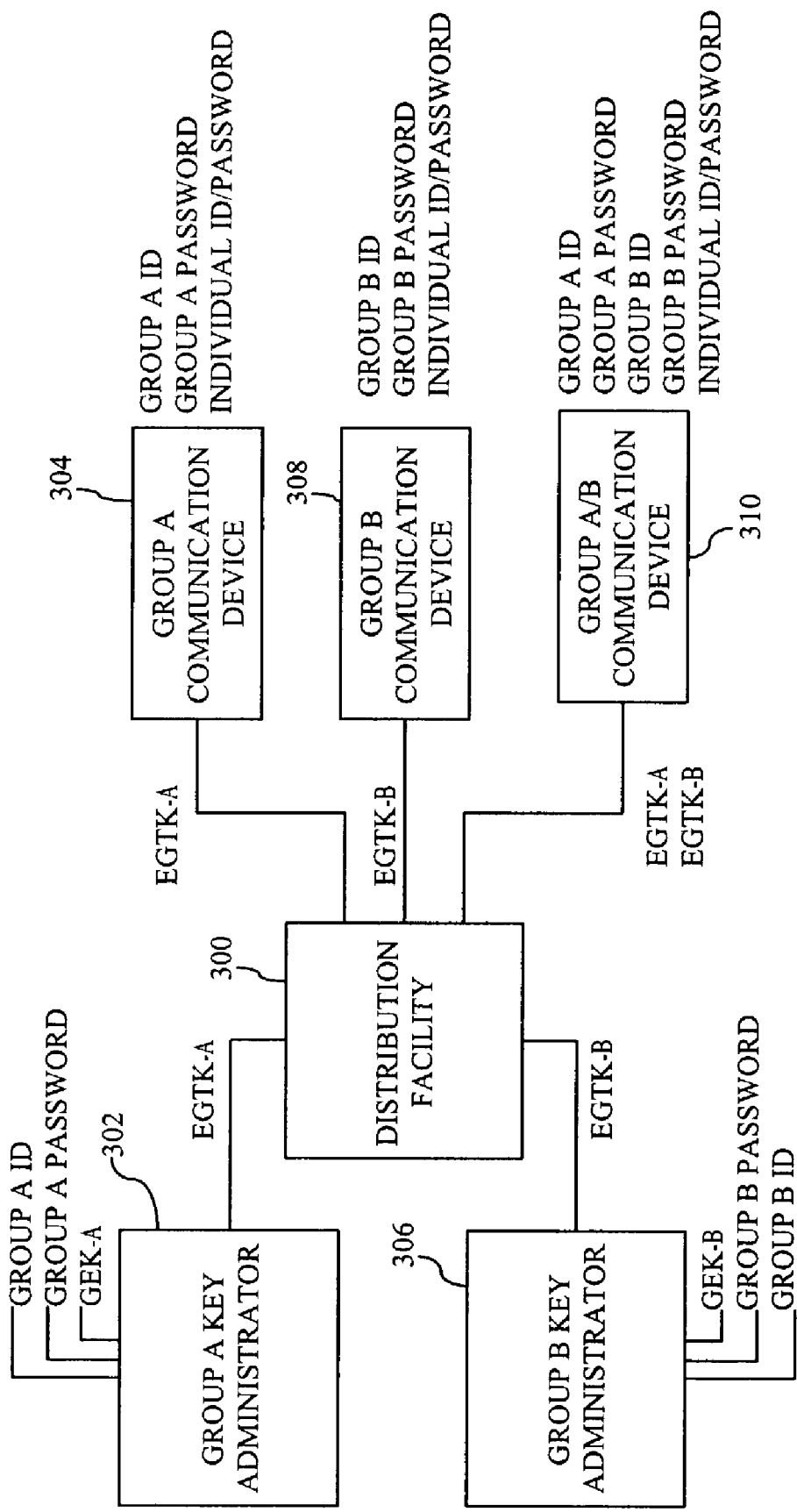
FIG. 3 is a block diagram of a system architecture for use with multiple groups in accordance with the present invention.

FIG. 3 depicts an embodiment of a system architecture for distributing GTKs in a multiple group system using a common distribution facility 300 in accordance with the present invention. In the illustrated embodiment, there are two groups, e.g., a police department communication group and a fire department communication group. Although there are two groups illustrated, it will be readily apparent that essentially any number of groups may be accommodated.

In the illustrated embodiment, a group A key administrator 302 generates a GEK, e.g., GEK-A, for encrypting/decrypting traffic at a group A communication device 304. The group A communication device 304 is a communication device that supplies the distribution facility 300 with an individual ID and password combination that is identified by the distribution facility 300 as a member of group A. Likewise, a group B key administrator 306 generates a GEK, e.g., GEK-B, for encrypting/decrypting traffic at a group B communication device 308. The group B communication device 308 is a communication device that supplies the distribution facility 300 with an individual ID and password combination that is identified by the distribution facility 300 as a member of group B.

The distribution facility 300 distributes the EGTK-A and EGTK-B to the group A and group B communication devices 304, 308, respectively, when they are logged into the communication system as described above. In addition, the distribution facility 300 distributes both the EGTK-A and the EGTK-B to a multiple group communication device, e.g., group A/B communication device 310. The group A/B communication device 310 is a communication device that supplies the distribution facility 300 with an individual ID and password combination that is identified by the distribution facility 300 as a member of both group A and group B.

To enable traffic encryption/decryption for communication with other group A communication devices, the group A communication device 304 is supplied with a group A ID and password known to group A members. Likewise, to enable traffic encryption/decryption for communication with other group B communication devices, the group B communication device 308 is supplied with a group B ID and password known to group B members. Since the group A/B communication device 310 is supplied with the IDs and passwords for both group A and group B, the group A/B communication device is able to encrypt/decrypt traffic for communication with both group A and group B communication devices 304, 308.

Thus, a method and system for securely distributing GTKs is disclosed. The GTKs are encrypted at the key administrator prior to storage at a distribution facility. The GTKs are then distributed to the individual group devices where they are decrypted for use in encrypting/decrypting traffic for that group. By encrypting the GTKs at the key administrator and only encrypting the GTKs at the group devices, the integrity of the communication system is strengthened.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A method for distributing encryption keys, said method comprising the steps of:
   encrypting a group traffic key at a key administrator using a group encryption key;
   passing said encrypted group traffic key to a distribution system for storage and distribution;
   distributing said encrypted group traffic key from said distribution system to at least one communication device belonging to at least one group;
   generating said group encryption key at said at least one communication device;
   decrypting said encrypted group traffic key at said at least one communication device using said generated group encryption key; and using said decrypted group traffic key for secure communications between said at least one communication device and other communication devices of said at least one group.

2. The method of claim 1, said encrypting step comprising at least the step of:
encrypting said group traffic key based on a group ID and a group password.

3. The method of claim 2 said generating step comprising at least the step of:
generating said group encryption key using said group ID and said passwords.

4. The method of claim 3 wherein said generating step comprises receiving said group ID and said group password as input by a user of said communication device.

5. The method of claim 4 wherein said generating step comprises combining said group ID and said group password and applying a secure hash to said combination.

6. The method of claim 5 wherein said group ID and said group password are combined by appending said group password to said group ID.

7. The method of claim 5 wherein said group ID and said group password are combined by appending said group password to said group ID.

8. The method of claim 4 wherein said generating step comprises combining said group ID and said group password and applying a secure hash to said combination.

9. The method of claim 1, said encrypting step comprising at least the steps of:
generating said group encryption key at said key administrator based on a group ID and a group password; and
encrypting said group traffic key using said group encryption key.

10. The method of claim 9, said encryption step further comprising at least the step of:
appending said group ID to said encrypted group traffic key to facilitate storage and retrieval of said encrypted group traffic key in said distribution step.

11. The method of claim 1, said decrypting step comprising at least the step of:
decrypting said group traffic key with said group encryption key.

12. The method of claim 1, further comprising the step of:
encrypting traffic from said one of said at least one communication devices for transmission to another of said at least one communication devices at said one of said at least one communication devices with said group traffic key.

13. The method of claim 1, further comprising the step of:
decrypting traffic received at said one of said at least one communication devices from another of said at least one communication devices with said group traffic key.

14. The method of claim 1, wherein said distribution system is accessible to users who are not members of a group which utilizes said group traffic key.

15. The method of claim 1, wherein said key administrator is under the control of a first organization and said distribution system is under the control of a second organization.

16. A method for distributing encryption keys, said method comprising the steps of:
encrypting a group traffic key at a key administrator using a first encryption key;
passing said encrypted group traffic key to a distribution system for storage and distribution;
distributing said encrypted group traffic key from said distribution system to at least one communication device belonging to at least one group;
receiving said encrypted group traffic key at one of said at least one communication devices;
generating a group encryption key corresponding to said first encryption key at said at least one communication device;
decrypting said encrypted group traffic key at said one of said at least one communication devices using said key corresponding to said first encryption key; and
using said decrypted group traffic key for secure communications between said at least one communication device and other communication devices of said at least one group.

17. The method of claim 16, said encrypting step comprising at least the step of:
encrypting said group traffic key with a group encryption key.

18. The method of claim 17, said decrypting step comprising at least the step of:
decrypting said group traffic key with said group encryption key.

19. The method of claim 16, said encrypting step comprising at least the steps of:
generating a group encryption key based on a group ID and a group password; and
encrypting said group traffic key using said group encryption key.

20. The method of claim 19, said generating step comprising at least the steps of:
generating said group encryption key using said group ID and said password.

21. The method of claim 20 wherein said generating step comprises receiving said group ID and said group password as input by a user of said communication device.

22. The method of claim 16, further comprising the step of:
encrypting traffic from said one of said at least one communication devices for transmission to another of said at least one communication devices at said one of said at least one communication devices with said group traffic key.

23. The method of claim 16, further comprising the step of:
decrypting traffic received at said one of said at least one communication devices from another of said at least one communication devices with said group traffic key.

24. The method of claim 16, wherein said key administrator is under the control of a first organization and said distribution system is under the control of a second organization.

25. A method for distributing encryption keys, said method comprising the steps of:
receiving an encrypted group traffic key at a distribution system for storage and distribution, said encrypted group traffic key encrypted using a first key;
distributing said encrypted group traffic key from said distribution system to at least one communication device belonging to at least one group;
generating said group encryption key corresponding to said first encryption key at said at least one communication device;
decrypting said group traffic key at said at least one communication device using a key corresponding to said first key; and
using said decrypted group traffic key for secure communications between said at least one communication device and other communication devices of said at least one group.

26. The method of claim 25 wherein said generating step comprises receiving said group ID and said group password from a user of said communication device.

27. The method of claim 26 wherein said generating step comprises combining said group ID and said group password and applying a secure hash to said combination.

28. The method of claim 27 wherein said group ID and said group password are combined by appending said group password to said group ID.

29. A encryption key distribution system comprising:
   an encrypted group traffic key generator for encrypting a group traffic key using a first key;
   a distribution system operably connected to said encrypted group traffic key generator for receiving said encrypted group traffic key from said encrypted group traffic key generator, said distribution system storing said encrypted group traffic key on a computer readable medium; and
   at least one group device belonging to at least one group and operably connected to said distribution system for receiving said encrypted group traffic key from said distribution system, said at least one group device capable of generating a group encryption key corresponding to said first encryption key at said at least one communication device and decrypting said encrypted group traffic key using said group encryption key to obtain said group traffic key, wherein said group traffic key is used for secure communications between said at least one communication device and other communication devices of said at least one group.

30. The system of claim 29, said encrypted group traffic key generator comprising at least:
   a first group encryption key generator for generating a group encryption key; and
   a key encryption and assembly generator coupled to said first group encryption key generator for encrypting said group traffic key using said group encryption key.

31. The system of claim 30, said at least one group device comprising at least:
   a second group encryption key generator for generating said group encryption key; and
   a key decryptor coupled to said second group encryption key generator for decrypting said encrypted group traffic key using said group encryption key; and
   a traffic encryptor/decryptor for encrypting/decrypting traffic using said decrypted group traffic key.

* * * * *